Dec. 14, 1926.

B. H. SMITH

METERING SYSTEM

Filed April 29, 1924

1,610,625

WITNESSES:
G. S. Neilson
E. R. Evans

INVENTOR
Benjamin H. Smith
BY
Wesley G. Carr
ATTORNEY

Patented Dec. 14, 1926.

1,610,625

UNITED STATES PATENT OFFICE.

BENJAMIN H. SMITH, OF SWISSVALE, PENNSYLVANIA, ASSIGNOR TO WESTINGHOUSE ELECTRIC & MANUFACTURING COMPANY, A CORPORATION OF PENNSYLVANIA.

METERING SYSTEM.

Application filed April 29, 1924. Serial No. 709,882.

My invention relates to metering systems and particularly to systems that are adapted to transmit meter indications over long distances.

One object of my invention is to provide a metering system adapted to transmit a variable quantity of meter reading by a series of current impulses, the rate of succession of the impulses depending upon the magnitude of the quantity being measured, and to furnish a direct indication of this quantity at a distant point upon the meter of the integrating or graphic type.

Another object of my invention is to provide a totalizing system of the current-impulse type that shall have means for totalizing the meter indications from several points without employing mechanical pawl and ratchet devices or similar complicated mechanism in connection with the totalizer.

Another object of my invention is to provide a remote or long-distance metering system that is adapted to actuate alternating-current meters of the standard or commercial types, so that the accuracy and reliability of the well-known induction-type watthour meters may be utilized with the consequent advantages that will be evident to those skilled in the art.

A further object of my invention is to provide a metering system that is adapted to so actuate a demand meter of the integrating type that the load demand in a remote circuit may be measured and recorded.

In accordance with my invention, a series of current impulses may be generated that will be proportional to the quantity being measured. This series of impulses may be transmitted over the connecting circuit, which may be a long trunk line, and is integrated by means of an impulse relay which charges and discharges a condenser through the windings of a meter, preferably of the recording or integrating type. A totalizing meter is so connected in series with a plurality of the condensers as to be actuated in accordance with the sum of the condenser currents. The meter then reads the total of the quantities being measured without the employment of the mechanical pawl-and-ratchet totalizing or transfer devices of the prior art. The occurrence of simultaneous impulses from two or more of the individual meters causes no difficulty.

Figure 1:
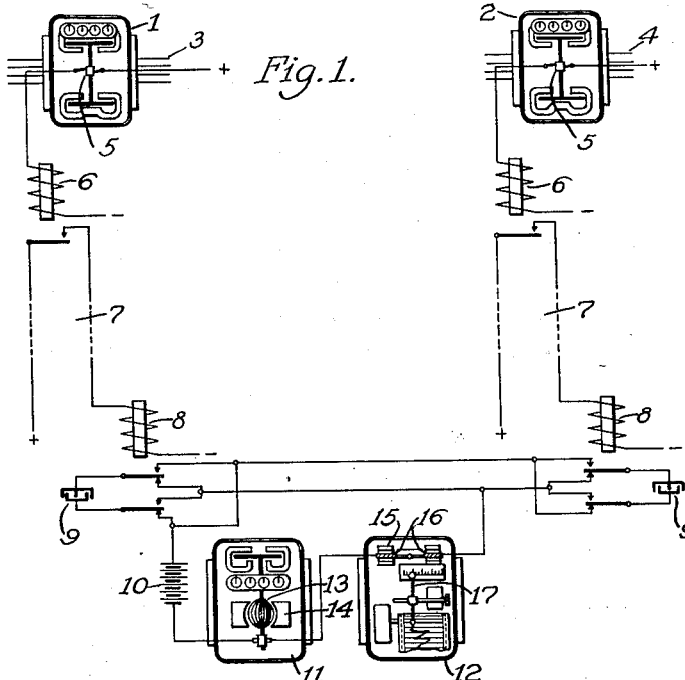
Figure 2:
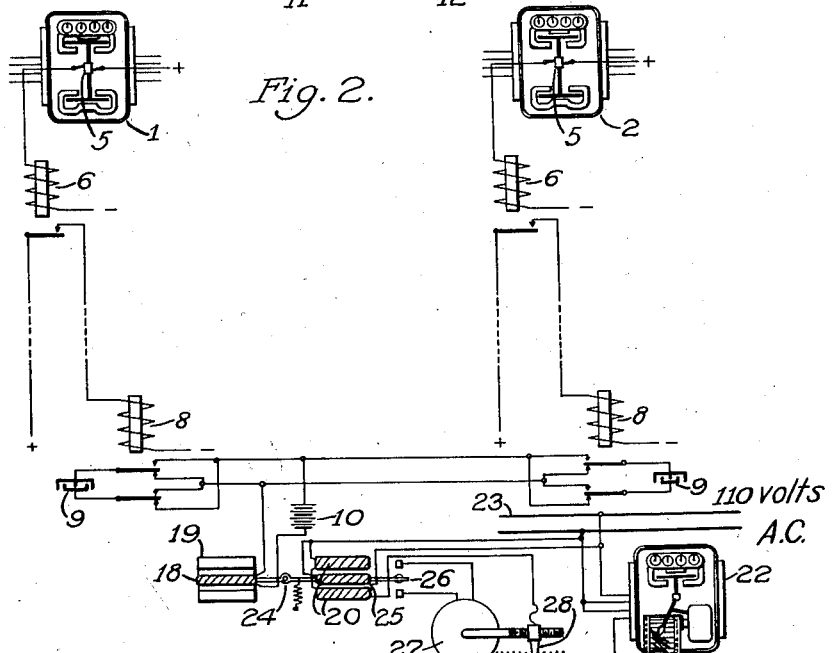

For a clearer understanding of my invention, reference may be had to the accompanying drawings wherein Figure 1 is a diagrammatic view of one modification thereof; and Fig. 2 is a similar view of another modification.

Referring to Figure 1, two meters 1 and 2 are shown that are actuated in accordance with the power load upon circuits 3 and 4. The meters 1 and 2 are represented as of the polyphase induction-motor type, but it is to be understood that they may be replaced by any motor-driven integrating meter. Furthermore, it will be obvious that, in certain application of my invention, other rotating or oscillating devices may be employed to generate current impulses at a rate proportional to the quantity being measured.

Each of the meters 1 and 2 is provided with a commutator 5 controlling the circuit of a relay 6. As the meter 1 operates the relay 6 is alternately energized and de-energized at a rate dependent upon the speed of operation of the meter, which is, in turn, dependent upon the load in the circuit 3. The contacts of the relay 6 close a circuit including the conductors of a trunk or control circuit 7 which may be of great length.

One application of my invention is in the metering of the substation loads in a power system comprising a plurality of interconnected substations. For instance, in a large city, the railway load is carried by a plurality of power substations or rotary-converter substations at separated points. At a central point is a load dispatcher's office, at which it is necessary to be able to read the loads on the respective substations and the total load on the system. In such a system, the meters 1 and 2 may be located in two substations, and the control trunks 7 may extend to the central office where the totalizing equipment is located.

A relay 8 is so connected in series with the trunk 7 as to be controlled by the relay 6. The relays 6 and 8, being periodically energized by current impulses, may be termed impulse relays. The impulse relay 8 becomes alternately energized and de-energized at a rate depending upon the load in the circuit 3, as its operation corresponds to that of relay 6. Since the rate of operation of the impulse relay 8 is not affected by the resistance, reactance or leakage of the trunk 7, there is no limit to the possible length of the trunk except that the relay 8 must have sufficient current to be operated when the circuit is closed. This condition may be met with almost any desired length of trunk. In prior meter-transmission systems, inaccuracy was introduced by the resistance of the tranmission circuit and a definite limit was thereby imposed upon the distance over which the apparatus would function satisfactorily.

A condenser 9 is connected to the armatures of relay 8. A battery 10 is connected in series with the contacts of relay 8, the condenser 9, an integrating meter 11 and a graphic meter 12.

The meter 11 is a direct-current ampere-hour meter of the usual construction. It may be, for instance, of the type shown in U. S. Patent No. 712,106 to Thomson, dated October 29, 1902, comprising a rotating armature winding 13 and a field magnet 14, that may be a permanent magnet or an electromagnet excited from a constant-voltage source.

The graphic meter 12 is of the usual Kelvin-balance type similar to that disclosed in my prior patent, Serial No. 1,194,084, dated August 8, 1916, and assigned to the Westinghouse Electric and Manufacturing Company. The meter comprises permanent magnets 15 co-operating with the movable coils 16, the torque exerted by the latter being balanced by a suitable mechanical connection between the pointer 17 and the arm supporting the coils 16.

The meter 11 integrates the total load recorded by the meters 1 and 2, and the meter 12 records the instantaneous fluctuations of the total load. Of course, it will be understood that either the integrating meter or the recording meter may be omitted if only the variations in load or the integrated load is desired.

The detailed operation is as follows:

The energization of relay 6 closes the circuit of relay 8, whereupon a circuit is closed from battery 10 though the meters 11 and 12 in series, the lower front contact of relay 8, the condenser 9, and the upper front contact of relay 8. A current flows through the circuit sufficient to charge the condenser 9 to the potential of the battery 10. When relay 6 subsequently becomes de-energized, it opens the circuit of relay 8, and a circuit is closed from the battery 10 through the meters 11 and 12, as before, the upper back contact of relay 8, the condenser 9 and the lower back contact of relay 8. The condenser 9 is therefore charged in the opposite direction, the flow of current through the meters 11 and 12 being in the same direction as before. The current which actuates the meters 11 and 12 is the sum of the condenser currents and, since the applied voltage of the battery 10 is constant, the current in the meter circuit depends only upon the rate at which the condenser is charged and discharged. By using a suitable battery voltage and condenser capacity, standard integrating and recording meters may be employed.

I have found that a suitable value of the voltage 10 is 50 or 100 volts and the capacity of the condenser 9 may be about one or two microfarads, depending upon the adjustment of the meter and the number of impulses per second received. The system may be adjusted so that the impulse rate varies from zero to 3 per second, the latter figure representing the maximum reading. Of course, still greater impulse rates may be employed. However, if we consider this range of impulse frequencies, it will be apparent that, for small values of the load, a lapse of several seconds occurs between successive impulses. It is one of the features of my invention that meters of the type shown at 11 and 12 will function accurately even when the impulses are received at this slow rate. The armature of the integrating meter 11 turns a fraction of a revolution upon each current impulse. The inertia of the moving parts of the graphic meter 12 is so great and the forces involved so slight, at the lower impulse rates, that this meter gives a steady indication of the instantaneous load at even the lower values. Its operation is naturally somewhat retarded upon sudden changes of load but this is a decided advantage in a graphic meter, as it results in a clear record of the average load fluctuations with an accurate indication of the maximum and minimum values.

It will be noted that, where two or more relays 8 are employed with two or more condensers 9, as shown, the meters 11 and 12 are actuated in accordance with the sum of the several condenser currents or the total load. There is no necessity for guarding against superimposed or simultaneous impulses. Obviously, if it is not desired to totalize several meter indications, my invention is also applicable. The meters are simply connected in circuit with a single condenser 9 which may be associated with additional contacts of relay 8, thereby obtaining the load upon a single substation instead of the total system load.

Referring to the modification shown in Fig. 2, the two meters 1 and 2 are similar to those shown in Fig. 1. These meters cooperate in the manner described above to actuate the impulse relays 8 at rates depending on the load or other measured quantity. Two condensers 9 are connected to the contacts of relays 8 as before, and a battery 10 is provided for the condenser circuit.

In series with the condensers 9 and the battery 10 is a movable winding 18 carried by the pivoted arm 24 of a Kelvin balance. A permanent magnet 19 is disposed adjacent the winding 18. The stationary windings 20 of the Kelvin balance are connected in series with a variable resistor 21 and a meter 22 to line conductors 23 of an alternating-current source. The movable element 24 of the Kelvin balance is provided with a second winding 25 and with a contact 26 which controls a reversible motor 27 in the usual manner. The motor 27 actuates a movable contact 28 co-operating with the balancing resistor 21. The voltage winding of the meter 22 is connected across the conductors 23. The meter 22 is shown as an alternating-current periodic watthour demand meter of the type shown in U. S. Patent No. 1,318,723, issued Oct. 14, 1919, to W. M. Bradshaw. It is actuated in accordance with the total watts of the combined loads measured by the meters 1 and 2. Obviously, the meter 22 may be an alternating-current wattmeter or watt regulator.

The operation is as follows:

The average current through the winding 18 of the Kelvin balance depends solely upon the instantaneous sum of the rates at which current impulses are received by the relays 8, as will be apparent from the considerations set forth above in connection with Fig. 1. A torque is, therefore, exerted upon the balance that is proportional to the sum of the loads recorded by the meters 1 and 2. The current through the stationary windings 20 depends upon the adjustment of the resistor 21, the voltage of the supply conductors 23 being constant. As the total load increases, the movable member 24 of the Kelvin balance moves its contact 26 to drive the motor 27 to cut down the resistance 21, thereby increasing the current in the winding 25 until a balance is reached. Thus, the current through the meter 22 is increased but, since the voltage applied to the voltage windings of this meter is constant the meter will be actuated in accordance with the total system load measured in watts.

As the total load decreases, the movable member 24 of the Kelvin balance moves in the opposite direction, thereby causing the motor 27 to rotate in the opposite direction and insert resistance in the circuit of the current winding of the meter 22, causing the latter to run more slowly.

It will be evident that, by the use of this modification of my invention, any standard wattmeter or watthour meter of the alternating-current type may be actuated in accordance with the load or load demand in one or more remote circuits. The particular advantage of this arrangement results from the fact that instruments of this type are more accurate and reliable than those of other types and this is especially true of the watthour demand meter illustrated. The induction-type watthour demand meter is far superior to any other instrument for recording load demand.

It will be apparent that I have provided an improved remote metering and totalizing system of the current-impulse type. By employing integrating and graphic meters of the described construction, the difficulties due to the intermittent character of the condenser currents are obviated and the meters may be calibrated to record with a high degree of accuracy. While the apparatus required is simple, the results are markedly better than those obtained by prior metering systems of this kind. Furthermore, the system is flexible in character as the totalizing connections may be changed to include a greater or lesser number of meters by simply connecting or disconnecting condensers in the circuit.

I claim as my invention:

1. A metering system comprising a plurality of trunk circuits, means for transmitting current impulses over each of said circuits, a relay associated with each of said circuits and responsive to said current impulses, a condenser connected to the contacts of each of said relays, a source of current, and a current-responsive device in series with said source and a plurality of said condensers.

2. A metering system comprising a plurality of devices for generating current impulses at rates proportional to the quantities to be measured, and means including a condenser individual to each device for totalizing the said quantities.

3. A metering system comprising a plurality of devices for generating current impulses at rates proportional to the quantities to be measured, a relay for each of said devices responsive to said current impulses, a condenser connected to the contacts of each of said relays, and a current-responsive device connected to all of said condensers for totalizing said quantities.

4. A totalizing system comprising a plurality of circuits, a condenser associated with each circuit, charging means associated with said condensers, and a totalizing instrument actuated by the total charging current of all of said condensers.

5. A totalizing system comprising a plurality of circuit-closing devices, a plurality of condensers, means for charging and discharging said condensers through the contacts of said circuit closing devices, and a totalizing instrument actuated by the sum of the condenser currents.

6. A totalizing system comprising a plurality of condensers, means for charging and discharging said condensers at rates proportional to the respective quantities being measured, and a current-responsive instrument so connected to all of said condensers as to be actuated in accordance with a function of all of said quantities.

7. A metering system comprising a plurality of trunk circuits, means for transmitting a series of current impulses over each of said circuits at a variable rate, a relay in each circuit responsive to said current impulses, and means including a condenser associated with said relays for measuring a desired quantity.

8. A metering system comprising an integrating meter, an impulse relay, means for operating said impulse relay at a rate depending upon the operation of said meter, a condenser, means including said relay for charging and discharging said condenser, a second integrating meter, and means including said condenser for actuating the last-named meter.

9. A metering system comprising two integrating meters provided with commutators, two impulse relays controlled thereby, two condensers connected respectively to the two relays, means including said relays for charging and discharging said condensers and a single totalizing instrument actuated in accordance with the sum of the condenser currents.

10. A metering system comprising two integrating meters provided with commutators, two impulse relays controlled thereby, two condensers connected respectively to the two relays in series with a source of current, and another integrating meter in series with said source.

11. A metering system comprising a plurality of trunk circuits, means for transmitting a series of current impulses, over each of said circuits at a variable rate, a relay in each circuit responsive to said current impulses, a condenser connected to the contacts of each relay, a device for indicating a desired quantity, and means including said relays and condensers for actuating said indicating device.

12. A metering system comprising an integrating motor-type meter, an impulse relay, means for operating said impulse relay at a rate depending upon the operation of said meter, a condenser, a source of current, means including said relay for charging said condenser from said source, and a second integrating meter of the motor type having its actuating windings connected in series with said condenser.

13. A metering system comprising an impulse relay, means for operating said impulse relay, an alternating-current source, a demand meter, and means including said impulse relay for energizing said demand meter in a predetermined manner from said source.

14. A metering system comprising a plurality of impulse relays, means for operating said impulse relays at rates corresponding to different loads, an alternating-current source, a demand meter, and means including said impulse relays and source for actuating said demand meter in accordance with the total load demand.

15. A metering system comprising an impulse relay, a condenser, means including said relay for intermittently charging said condenser, a watt meter instrument, and connections for said instrument for actuating the same in accordance with energy expressed in watts proportional to the average condenser-charging current.

In testimony whereof, I have hereunto subscribed my name this 24th day of April, 1924.

BENJAMIN H. SMITH.